Patented Jan. 15, 1952

2,582,936

UNITED STATES PATENT OFFICE 2,582,936

PROCESS FOR THE MANUFACTURE OF GAS MIXTURES RICH IN AMMONIA IN GENERATORS

Zsigmund von Gálocsy, Berg en Terblijt, Netherlands, assignor to Vogogas S. A., Zurich, Switzerland No Drawing. Application January 13, 1949, Serial No. 70,794. In the Netherlands January 15, 1948

6 Claims. (Cl. 252—375)

This invention relates to a process for the manufacture of gas mixtures rich in ammonia in generators.

It is a well known fact that in the gasification of coarse grained carbonaceous material carried out in generators, the presence of water vapour has a favourable effect on the formation of ammonia and on the protection of the ammonia formed. According to the known processes an excess of water vapour is fed into the lower part of the generator together with the oxygen or gases containing oxygen which are required for the gasification. In this way about 80% of the nitrogen present in the carbonaceous materials can be converted into ammonia. However a drawback attached to this process is that in the zone of gasification the temperature drops considerably because of the addition of an excess of water vapour, as a result of which the carbon dioxide content in the gas mixture produced is high so that the gas is less valuable. The increased yield of ammonia prepared according to this process is attended with a decrease in quality of the gas mixture produced and with a decreasing efficiency of the generator.

Further it is known that when sulphur compounds and carbon dioxide are removed from gases, such as coke oven gas, illuminating gas, etc. by washing these gases with ammonia liquor, part of the ammonia cannot be recovered. When gases containing ammonia are being washed these ammonia losses are simply supplied, but if generator gases, containing little ammonia, are being washed in this manner, these losses have to be reckoned with. This holds especially for those gas mixtures which are obtained in the gasification of coarse grained carbonaceous materials with oxygen.

Now it has been found that a gas mixture rich in ammonia, can be obtained by gasifying coarse grained carbonaceous materials, containing nitrogen, in generators with oxygen or gases containing oxygen, if water vapour is fed into the generator at one or more places where a temperature of 900° C. or more prevails and, where the gasification has entirely or for the greater part been concluded.

The amount of water vapour which according to the invention is fed into the generator, is preferably larger than the amount theoretically required for converting the nitrogen present, so that the nitrogen protecting action of the water vapour can be made use of. Favourable results are obtained if the amount of water vapour supplied is equal to the amount of water vapour which in the processes applied hitherto, leave the zone of gasification without being converted. If desired the water vapour may be fed into the generator at a temperature of 100 or 200° C. without being preheated, while it is further possible for the temperature of the gas mixture leaving the generator to be regulated by means of preheating the water vapour.

In addition to the introduction of water vapour the composition of the gas mixture produced may also be influenced by feeding pulverulent or fine grained catalysts for the conversion of carbon monoxide, such as e. g. lime, magnesia, generator ores etc. into the generator with the aid of the stream of water vapour.

Moreover the composition of the gas mixture produced may be varied if gaseous or liquid hydrocarbons such as e. g. oil fractions, tar, mazout, mineral gas, gases prepared from carbonaceous materials, such as coke oven gas, whether or not mixed with carbon dioxide, preferably preheated are fed into the generator, either together with the water vapour or separately, in one or more places suited for introducing the water vapour, as a result of which various reactions may occur:

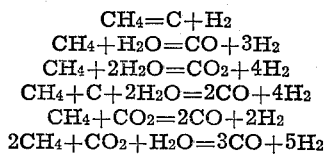

$$CH_4 = C + H_2$$
$$CH_4 + H_2O = CO + 3H_2$$
$$CH_4 + 2H_2O = CO_2 + 4H_2$$
$$CH_4 + C + 2H_2O = 2CO + 4H_2$$
$$CH_4 + CO_2 = 2CO + 2H_2$$
$$2CH_4 + CO_2 + H_2O = 3CO + 5H_2$$

By modifying the conditions of the reaction such as temperature, character and quantity of the hydrocarbons supplied, the amount of water vapour, the amount of carbon dioxide, the composition of the gas mixture in the generator may be varied.

Moreover the ammonia content of the gas mixture may be influenced by feeding substances containing nitrogen, such as e. g. flue gases, into the generator, while also a gas mixture can be obtained containing nitrogen and hydrogen in such a ratio that it is suitable for the use as a starting material for the synthesis of ammonia.

Furthermore part of the gas mixture produced may be withdrawn from the generator in one or more places, located below the places where the water vapour is fed into the generator, which withdrawn part after utilizing the heat present therein may be added, if desired, in whole or in part to the gas mixture produced or may be used separately for instance as a synthesis gas.

The process according to the invention not only offers the advantage that the actual gasification remains unaffected by the introduction of water vapour so that a gas mixture rich in ammonia with a high percentage of carbon monoxide and a low content of carbon dioxide is obtained but moreover the formation of tar which takes place above the actual space of gasification is favourably influenced if the carbonaceous material to be gasified consists of coal, so that a higher yield of tar is obtained and the undesirable formation of so-called thick tar is avoided.

The process according to the invention is not restricted to the application in the usual shaft generators but may also be applied in the manufacture of metals, particularly of iron, in blast furnaces, in which the reduction of ores is carried out with coarse-grained carbonaceous materials and/or with the gases prepared therefrom in the blast furnace, while simultaneously synthesis gas is obtained.

It is known that oxygen together with water vapour may be added to the air of combustion to be introduced into the blast furnace, so that a blast furnace gas mixture is obtained which may be used for the synthesis of ammonia.

To this known process, however, the following drawbacks are attached:

(a) The gas mixture thus prepared always contains more nitrogen than is required for the hydrogen-nitrogen-ratio of the synthesis gas for the manufacture of ammonia, because the amount of oxygen added to the air of combustion may not exceed 30-32%.

(b) The conversion of the water vapour takes place in the gasifying zone, as a result of which the temperature falls and the formation of carbon dioxide is promoted, so that the efficiency of the blast furnace decreases.

(c) A gas mixture rich in ammonia cannot be prepared in this way so that only a gas mixture can be produced suited for the synthesis of ammonia, but no gas mixtures which after elimination of the ammonia can be used for other syntheses, such as the synthesis of hydrocarbons, methanol etc.

When the process according to the invention is applied to blast furnaces the drawbacks mentioned are avoided while moreover the following advantages are obtained:

1. On account of the water vapour being introduced separately all nitrogen present may be converted into ammonia, if desired, while simultaneously the ammonia formed is protected against decomposition.

2. The ore mixture is a good catalyst for the conversion of carbon monoxide with water vapour so that the hydrogen content of the gas mixture may also be influenced without the water vapour reacting with the carbonaceous materials present in the blast furnace, so that a smaller amount of carbonaceous materials may be used.

3. The conditions of reaction may be selected in such a manner that all carbon monoxide is converted.

4. With the help of hydrogen, formed from the water vapour the sulphur and/or phosphor compounds may be converted, so that the metal obtained is practically free from sulphur and/or phosphor so that less lime need be added to the slag, while moreover ores containing sulphur and/or phosphor may be processed, which according to the usual methods cannot or hardly be reduced. In this case more water vapour will have to be supplied than is required for the formation of the maximal amount of ammonia.

5. The conversion of the carbon monoxide takes place in the blast furnace so that no special plant need be constructed for this purpose.

6. Since e. g. 1 M³ of superheated water vapour of 700° C. and 1 at. contains a quantity of heat amounting to 273 kcal. and 451 kcal. of heat are set free in the conversion of carbon monoxide with this water vapour, the introduction of this water vapour has a heat supplying effect, so that less carbonaceous materials may be used.

7. If desired atmospheric air, without addition of oxygen may be used for the gasification.

I claim:

1. A process for gasifying coarse-grained carbonaceous material containing nitrogen to make gas mixtures containing substantial quantities of ammonia in which the carbonaceous material is gasified in a vertically elongated zone by means of a gasifying medium containing oxygen, said medium being introduced into the lower part of said zone to cause the gasifying reaction to take place in said lower part, and the gasifying temperature being maintained in said lower part by means of the heat set free by the exothermic gasifying reaction, which process comprises the following steps: passing the hot gases produced in said lower part upwardly towards the upper part of said zone and discharging said gases from said upper part, introducing said carbonaceous material into said upper part of said zone, passing said material from said upper part downwardly to said lower part in countercurrent to said hot gases flowing upwardly, preheating said material on its downward way by direct contact with said hot gases flowing upwardly until a temperature of at least 900° C. is reached, introducing steam into the mass of said material thus preheated to said temperature of at least 900° C., converting the nitrogen contained in said carbonaceous material into ammonia by reaction with said steam, passing the ammonia thus obtained together with said hot gases towards the upper part of said producer, passing further downwardly from said steam introduction point the carbonaceous material substantially free from nitrogen, further preheating said carbonaceous material by means of the said hot gases until upon arrival at the lower part of said zone the gasifying temperature is reached and gasifying said carbonaceous material in said lower part of said zone.

2. A process as claimed in claim 1, wherein a nitrogen-containing gas is introduced into said reaction zone at said steam introduction point simultaneously with the introduction of said steam.

3. A process as claimed in claim 2, wherein said nitrogen-containing gas is flue gas.

4. A process as claimed in claim 1, wherein said vertically elongated zone is formed by a blast furnace in which an ore is reduced in admixture with said carbonaceous material containing nitrogen.

5. A process as claimed in claim 1, wherein liquid organic hydrocarbon material is fed into said vertically elongated zone together with said steam.

6. A process as claimed in claim 1, wherein a gaseous organic hydrocarbon material is fed into said vertically elongated zone together with said steam.

ZSIGMUND von GÁLOCSY.

REFERENCES CITED

The following references are of record in the file of this patent:

UNITED STATES PATENTS

| Number | Name | Date |
| --- | --- | --- |
| 1,794,231 | Humphrey | Feb. 24, 1931 |

FOREIGN PATENTS

| Number | Country | Date |
| --- | --- | --- |
| 120,546 | Great Britain | Jan. 15, 1920 |
| 360,618 | Great Britain | Nov. 12, 1931 |